Apr. 3, 1923.

J. A. HEIDBRINK.
DENTAL DEVICE FOR SPREADING TISSUES.
FILED SEPT. 25, 1920.

1,450,419

INVENTOR:
JAY A. HEIDBRINK.
BY Whiteley and Ruckman
ATTORNEYS.

Patented Apr. 3, 1923.

1,450,419

UNITED STATES PATENT OFFICE.

JAY A. HEIDBRINK, OF MINNEAPOLIS, MINNESOTA.

DENTAL DEVICE FOR SPREADING TISSUES.

Application filed September 25, 1920. Serial No. 412,704.

*To all whom it may concern:*

Be it known that I, JAY A. HEIDBRINK, a citizen of the United States, residing at Minneapolis, in the county of Hennepin and State of Minnesota, have invented certain new and useful Improvements in Dental Devices for Spreading Tissues, of which the following is a specification.

My invention relates to dental devices for spreading tissues. It sometimes happens that roots of teeth become covered by the gums growing over them, and it also sometimes happens that teeth, particularly wisdom teeth, fail to grow out through the gums. An object of my invention, therefore, is to provide a device for spreading the tissues after an incision has been made in order that working upon such teeth may be facilitated.

The full objects and advantages of my invention will appear in connection with the detailed description thereof, and the novel features embodied in my inventive idea will be particularly pointed out in the claims.

In the accompanying drawings which illustrate the application of my invention in one form,—

Figure 1:
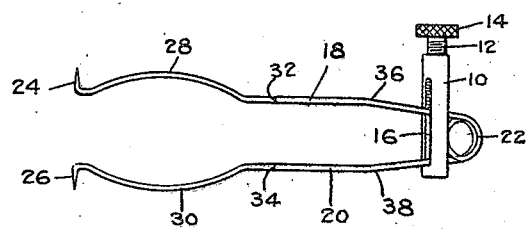
Figure 2:
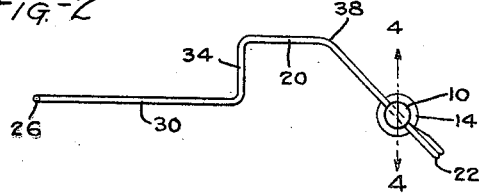
Figure 3:
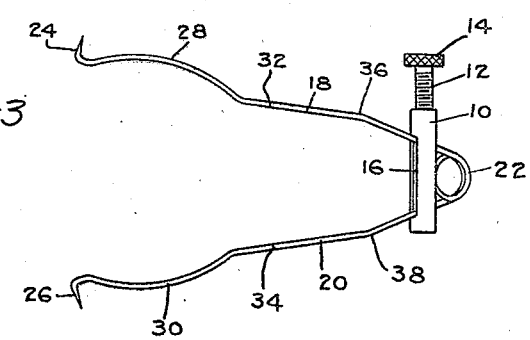
Figure 4:
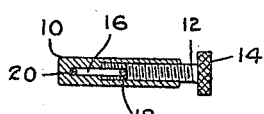

Fig. 1 is a side elevational view. Fig. 2 is a plan view. Fig. 3 is a side elevational view showing the device adjusted to a different position from that shown in Fig. 1. Fig. 4 is a view in section on the line 4—4 of Fig. 2.

Referring to the particular construction shown in the drawings, the numeral 10 designates a short tubular member closed at one end and having the other end provided with a screw-threaded opening to receive a screw 12 having a milled head 14. Between its ends, the tubular member is provided with two diametrically opposite slots 16 through which are passed the two arms 18 and 20 of a wire coiled at its middle to form a spring portion 22 at the rear of the device. The forward ends of the two arms are turned outwardly in opposite directions and sharpened to form points 24 and 26. The portions of the arms adjacent these points are bowed outward at 28 and 30, and are then offset at 32 and 34. At the rear of these offset portions, the arms extend substantially parallel for a distance and are then bent at 36 and 38 to form portions which merge into the spring 22.

The operation and advantages of my invention will be apparent from the foregoing description. After an incision has been made in the gum lying over a tooth, the spring arms of the device are pressed together and the points inserted into the tissue at opposite sides of the incision. Upon releasing the pressure on the spring arms, the tissue will be spread and the tooth is thereby exposed for the operator to work upon. In use, the device is inserted into the mouth of the patient so that the offset portions 32 and 34 come inside of the front teeth, thus bringing the points 24 and 26 into position. In operating upon the lower jaw, the device occupies the position shown in Fig. 2, and for operating upon the upper jaw, the device is turned the other side up. The tension exerted by the spring arms may be readily regulated by means of the screw 12. When this screw is turned down into the position shown in Fig. 1, the spread of the spring arms is decreased and the force with which the arms tend to separate is also decreased. The latter result will be apparent from Fig. 3 in which position of the screw 12 the arms are subjected to a much greater action of the spring 22 than they are in the position shown in Fig. 1. The degree to which the tissues will be spread is, therefore, readily controlled by means of the screw 12.

I claim:

1. A dental device for spreading tissues comprising a short tubular member provided with a screw-threaded opening at one end, a screw fitting the threads of said opening, said tubular member being provided with two diametrically opposite slots between its ends, and two arms normally stressed apart extending through said slots and having pointed front ends.

2. A dental device for spreading tissues comprising a short tubular member provided with a screw-threaded opening at one end, a screw fitting the threads of said opening, said tubular member being provided with two diametrically opposite slots between its ends, two arms extending through said slots and having pointed front ends, and a spring member connecting said arms at their rear ends and tending normally to stress the arms apart, said arms having offset portions which adapt the device to the mouth of a patient.

3. A dental device for spreading tissues comprising a short tubular member closed at one end and provided with a screw-threaded opening at the other end, a screw fitting the threads of said opening, said tubular member being provided with two diametrically opposite slots between its ends, two arms extending through said slots and having pointed front ends, and a coiled spring member connecting said arms at their rear ends and tending normally to stress the arms apart, said arms having offset portions which adapt the device to the mouth of a patient, and having outwardly bowed portions which connect said offset portions with pointed front ends.

In testimony whereof I hereunto affix my signature.

JAY A. HEIDBRINK.